(12) United States Patent
    Ichikawa (10) Patent No.: US 9,734,413 B2
(45) Date of Patent: Aug. 15, 2017

(54) IMAGE GENERATION APPARATUS AND PAVER OPERATION ASSISTANCE SYSTEM

(71) Applicant: SUMITOMO HEAVY INDUSTRIES, LTD., Tokyo (JP)

(72) Inventor: Tomoko Ichikawa, Kanagawa (JP)

(73) Assignee: SUMITOMO HEAVY INDUSTRIES, LTD., Tokyo (JP)

( * ) Notice: Subject to any disclaimer, the term of this patent is extended or adjusted under 35 U.S.C. 154(b) by 41 days.

(21) Appl. No.: 14/667,837

(22) Filed: Mar. 25, 2015

(65) Prior Publication Data

US 2015/0199576 A1   Jul. 16, 2015

Related U.S. Application Data

(63) Continuation of application No. PCT/JP2013/076201, filed on Sep. 27, 2013.

(30) Foreign Application Priority Data

Nov. 8, 2012  (JP) ................................ 2012-246578

(51) Int. Cl.
    G06K 9/00      (2006.01)
    E01C 19/48     (2006.01)
    G06T 3/40      (2006.01)
    E01C 19/00     (2006.01)
    E01C 23/16     (2006.01)

(52) U.S. Cl.
    CPC ........ *G06K 9/00791* (2013.01); *E01C 19/004* (2013.01); *E01C 19/48* (2013.01); *E01C 23/163* (2013.01); *G06T 3/4038* (2013.01)

(58) Field of Classification Search
    CPC . G06K 9/00791; E01C 19/004; E01C 23/163; E01C 19/48; G06T 3/4038

USPC ........................................................ 382/104
See application file for complete search history.

(56) References Cited

U.S. PATENT DOCUMENTS

2012/0257009 A1* 10/2012 Lee .................... H04N 5/232
                                                    348/36
2013/0182066 A1    7/2013 Ishimoto

FOREIGN PATENT DOCUMENTS

JP       2009-019353        1/2009
JP       2009019353 A  *    1/2009
WO       2012/043522        4/2012

OTHER PUBLICATIONS

International Search Report mailed on Jan. 7, 2014.

* cited by examiner

*Primary Examiner* — Amandeep Saini
(74) *Attorney, Agent, or Firm* — IPUSA, PLLC (57) ABSTRACT

An image generation apparatus includes a processor that generates an output image based on input images captured by multiple imaging units mounted on a paver including a hopper, a tractor, and a screed. The output image includes a hopper image representing a downward view of the hopper, a left-side surrounding image representing a downward view of a surrounding area on the left side in a movement direction of the paver, a right-side surrounding image representing a downward view of a surrounding area on the right side in the moving direction of the paver, and an illustration image of the tractor. The processor arranges the hopper image, the left-side surrounding image, the right-side surrounding image, and the illustration image such that the output image represents a downward view of the paver.

10 Claims, 5 Drawing Sheets

IMAGE GENERATION APPARATUS AND PAVER OPERATION ASSISTANCE SYSTEM

RELATED APPLICATIONS

The present application is a continuation application filed under 35 U.S.C. 111(a) claiming benefit under 35 U.S.C. 120 and 365(c) of PCT International Application No. PCT/JP2013/076201 filed on Sep. 27, 2013, which is based on and claims the benefit of priority of Japanese Patent Application No. 2012-246578 filed on Nov. 8, 2012, the entire contents of which are incorporated herein by reference.

BACKGROUND

Technical Field

An aspect of this disclosure relates to an image generation apparatus and a paver operation assistance system including the image generation apparatus.

Description of Related Art

There exists a known operator assistance apparatus for an asphalt finisher. The operator assistance apparatus includes a camera for capturing an image of the inside of a hopper, a camera for capturing an image of an area around a left outer side of the hopper, and a camera for capturing an image of an area around a right outer side of the hopper.

The asphalt finisher includes a monitor that displays the images captured by the cameras at a position that is visible from an operator seat that is movable in a vehicle width direction. The operator assistance apparatus automatically switches images displayed on the monitor according to the position of the operator sheet in the vehicle width direction. Thus, the operator assistance apparatus enables an operator to easily view blind areas that change depending on the position of the operator sheet.

However, the operator assistance apparatus of the related art only enables the operator to view blind areas around the hopper, and cannot enable the operator to view other blind areas around the asphalt finisher. Accordingly, the operator assistance apparatus of the related art cannot sufficiently assist operation of the asphalt finisher.

For the above reasons, it is desired to provide an image generation apparatus and a paver operation assistance system that can display surrounding blind areas in an easily-understandable manner.

SUMMARY

In an aspect of this disclosure, there is provided an image generation apparatus including a processor that generates an output image based on input images captured by multiple imaging units mounted on a paver including a hopper, a tractor, and a screed. The output image includes a hopper image representing a downward view of the hopper, a left-side surrounding image representing a downward view of a surrounding area on the left side in a movement direction of the paver, a right-side surrounding image representing a downward view of a surrounding area on the right side in the moving direction of the paver, and an illustration image of the tractor. The processor arranges the hopper image, the left-side surrounding image, the right-side surrounding image, and the illustration image such that the output image represents a downward view of the paver.

DETAILED DESCRIPTION

Preferred embodiments of the present invention are described below with reference to the accompanying drawings.

Figure 1:
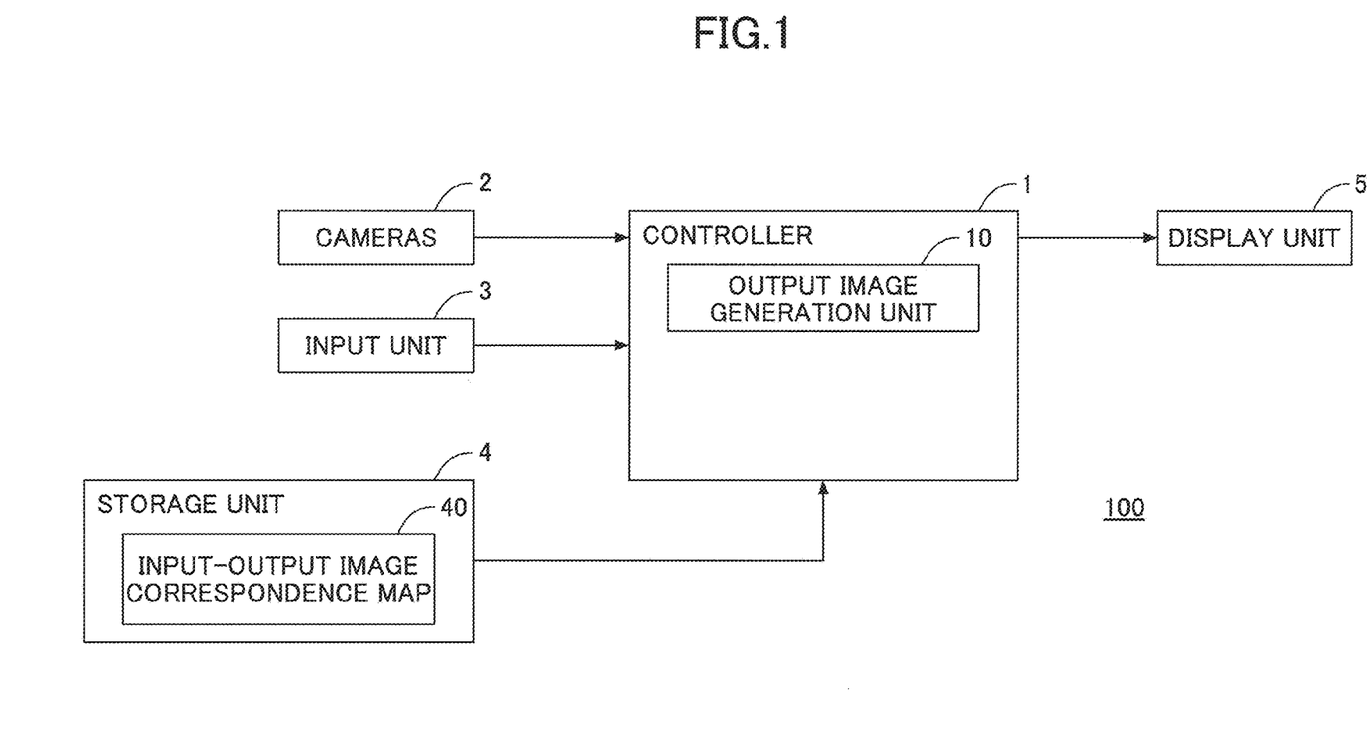
FIG. 1 is a block diagram illustrating an exemplary configuration of an image generation apparatus according to an embodiment.

FIG. 1 is a block diagram illustrating an exemplary configuration of an image generation apparatus according to an embodiment.

An image generation apparatus 100 generates an output image based on input images captured by cameras 2 mounted, for example, on a paver. In the present embodiment, the image generation apparatus 100 is provided in an asphalt finisher 60 that is a paver, and includes a controller 1, the cameras 2, an input unit 3, a storage unit 4, and a display unit 5.

Figure 2A:
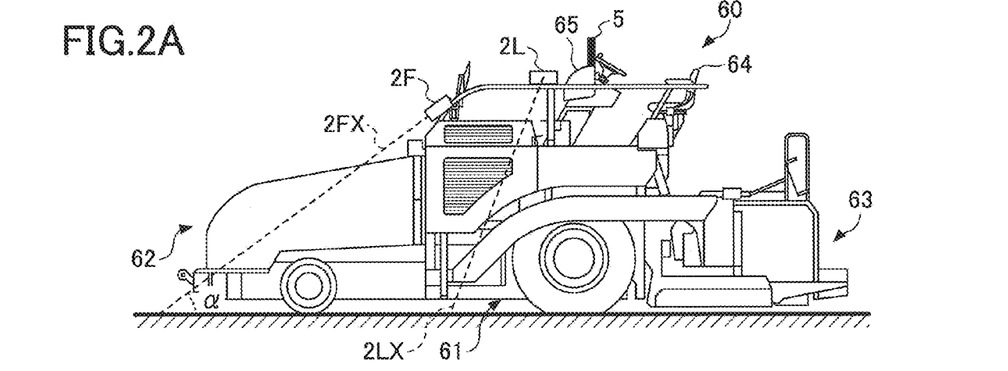
FIGS. 2A through 2C are drawings illustrating an exemplary configuration of an asphalt finisher in which the image generation apparatus of FIG. 1 is provided.
Figure 2B:
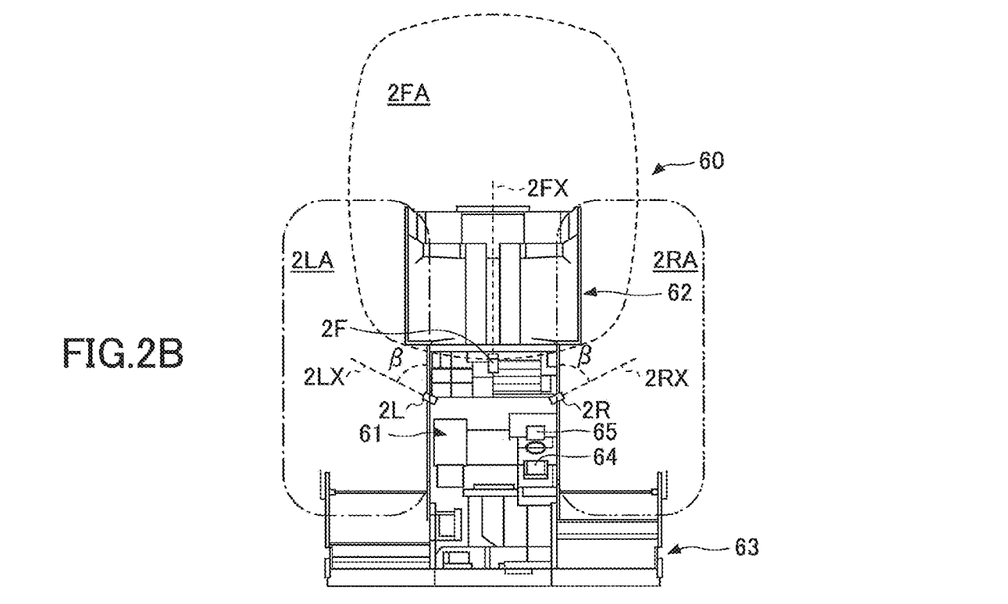
Figure 2C:
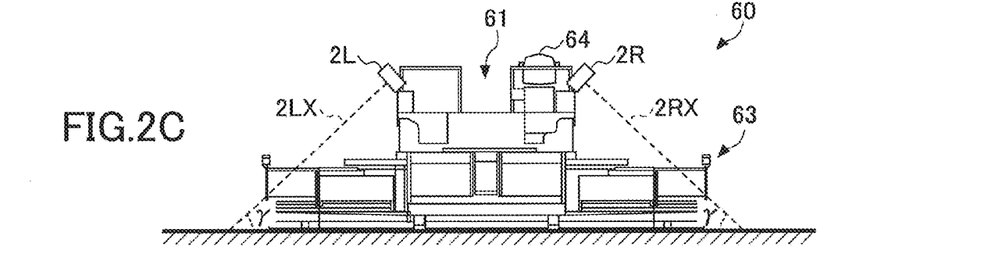

FIGS. 2A through 2C are drawings illustrating an exemplary configuration of the asphalt finisher 60 in which the image generation apparatus 100 is provided. FIG. 2A is a left side view, FIG. 2B is a top view, and FIG. 2C is a rear view of the asphalt finisher 60.

The asphalt finisher 60 includes a tractor 61, a hopper 62, and a screed 63.

The tractor 61 is a mechanism for causing the asphalt finisher 60 to run. In the present embodiment, the tractor 61 rotates four wheels using a hydraulic drive motor to move the asphalt finisher 60. The hydraulic drive motor (not shown) is rotated by a hydraulic fluid supplied from a hydraulic pump (not shown) driven by a motor (not shown) such as a diesel engine. A cab including an operator seat 64 and an operation unit 65 is disposed above the tractor 61.

The cameras 2 (a right side camera 2R, a left side camera 2L, and a front camera 2F) are mounted on the tractor 61. Also, the display unit 5 is disposed in the cab at a position that is easily visible by an operator. In the present embodiment, the direction of the hopper 62 seen from the tractor 61 is referred to as "front" and the direction of the screed 63 seen from the tractor 61 is referred to as "rear".

The hopper 62 is a mechanism for receiving an asphalt mixture. In the present embodiment, the hopper 62 can be opened and closed in a vehicle width direction of the asphalt finisher 60 by a hydraulic cylinder (not shown). Normally, the asphalt finisher 60 receives an asphalt mixture from a load-carrying platform of a dump truck (not shown) with the hopper 62 fully opened. In FIG. 2B, the hopper 62 is fully opened. When the amount of the asphalt mixture in the hopper 62 decreases, the hopper 62 is closed so that the asphalt mixture located near the inner wall of the hopper 62 is concentrated in the central part of the hopper 62 and fed to the screed 63.

The screed 63 is a mechanism for spreading and smoothing the asphalt mixture. In the present embodiment, the screed 63 can be moved upward and downward in the vertical direction and can be expanded and contracted in the vehicle width direction by a hydraulic cylinder (not shown). More specifically, when expanded in the vehicle width direction, the width of the screed 63 is greater than the width of the tractor 61.

Next, components of the image generation apparatus 100 are described.

The controller 1 is a computer that includes, for example, a central processing unit (CPU), a random access memory (RAM), a read only memory (ROM), and a non-volatile random access memory (NVRAM). For example, the controller 1 stores a program corresponding to an output image generation unit 10 described layer in the ROM or the NVRAM, and causes the CPU to execute a process corresponding to the output image generation unit 10 using the RAM as a temporary storage area.

The cameras 2 capture input images of areas around the asphalt finisher 60. For example, the cameras are mounted on the tractor 61 to be able to capture images of blind areas that cannot be seen by an operator in the cab.

Examples of blind areas include an internal space (particularly a space close to the tractor 61) of the hopper 62, spaces outside of right and left front corners of the hopper 62 when the hopper 62 is closed, and spaces that are close to the road surface near right and left sides of the asphalt finisher 60 (particularly a space that is on the opposite side from the cab with respect to a vehicle central axis in the vehicle width direction; when, for example, the cab is disposed on the right side with respect to the vehicle central axis in the vehicle width direction as in the present embodiment, a space close to the road surface near the left side of the asphalt finisher 60).

The cameras 2 may also be mounted on parts (e.g., rear part) of the tractor 61 other than the right side part, the left side part, and the front part. Also, the cameras 2 may be equipped with wide-angle lenses or fish-eye lenses to be able to capture images of wider ranges. The cameras 2 may also be mounted on the hopper and the screed 63.

In the present embodiment, the cameras 2 include the front camera 2F, the left side camera 2L, and the right side camera 2R. As illustrated in FIG. 2A and FIG. 2B, the front camera 2F is mounted on a front upper end of the tractor 61 such that an optical axis 2FX of the front camera 2F extends in a forward movement direction and forms an angle α (e.g., 65 degrees) with the road surface in side view. As illustrated in FIG. 2A through FIG. 2C, the left side camera 2L is mounted on a left-side upper end of the tractor 61 such that an optical axis 2LX of the left side camera 2L forms an angle β (e.g., 70 degrees) with a left-side surface of the tractor 61 in top view and forms an angle γ with the road surface in rear view. The right side camera 2R is mounted on the tractor 61 in a similar manner to be symmetrical to the left side camera 2L. In FIG. 2B, an area 2FA surrounded by a broken line indicates an imaging range of the front camera 2F, an area 2LA surrounded by a dashed-dotted line indicates an imaging range of the left side camera 2L, and an area 2RA surrounded by a dashed-double-dotted line indicates an imaging area of the right side camera 2R.

The cameras 2 may be mounted on a mounting stay extending from the tractor 61, may be directly mounted on the tractor 61 without using a mounting stay, or may be embedded in the tractor 61.

The cameras 2 captures input images according to control signals from the controller 1, and outputs the captured input images to the controller 1. Also, when input images are captured using fish-eye lenses or wide-angle lenses, the cameras 2 may be configured to correct apparent distortion, tilt, and shift of the input images caused by the lenses and output the corrected input images to the controller 1. The cameras 2 may instead be configured to output the input images without correcting the apparent distortion, tilt, and shift. In this case, the controller 1 corrects the apparent distortion, tilt, and shift.

Thus, the cameras 2 capture input images such that the captured images include multiple blind areas on the left and right sides of the asphalt finisher 60 and in and around the hopper 62.

The input unit 3 is a device such as a touch panel or a button switch that enables a user such as an operator to input various types of information to the image generation apparatus 100.

The storage unit 4 is a device such as a hard disk, an optical disk, or a semiconductor memory that stores various types of information.

The display unit 5 is a device such as a liquid crystal display that is disposed in the cab and displays image information. The display unit 5 displays various images output by the controller 1.

The output image generation unit 10 generates an output image. The output image generation unit 10, for example, associates coordinates on input image planes of input images captured by the cameras 2 with coordinates on an output image plane of an output image by referring to an input-output image correspondence map 40 stored in the storage unit 4. More specifically, the output image generation unit 10 generates an output image by associating values (e.g., luminance, hue, and saturation values) of pixels in the output image with values of pixels in input images.

The input-output image correspondence map 40 stores the correspondence between coordinates on the input image planes and coordinates on the output image plane. The correspondence is predetermined based on parameters such as optical centers, focal lengths, CCD sizes, optical-axis direction vectors, camera-horizontal-direction vectors, and projection methods of the cameras 2. Also, when input images include apparent distortion, tilt, and shift, the correspondence between coordinates on the input image planes and coordinates on the output image plane is determined such that the apparent distortion, tilt, and shift do not appear in the output image. For example, a group of coordinates forming a non-rectangular area on an input image plane are associated with a group of coordinates forming a rectangular area on the output image plane. On the other hand, when apparent distortion, tilt, and shift in an input image have been corrected during a capturing process of the input image, a group of coordinates forming a rectangular area on the input image plane are associated, without a change, with a group of coordinates forming a rectangular area on the output image plane.

Figure 3:
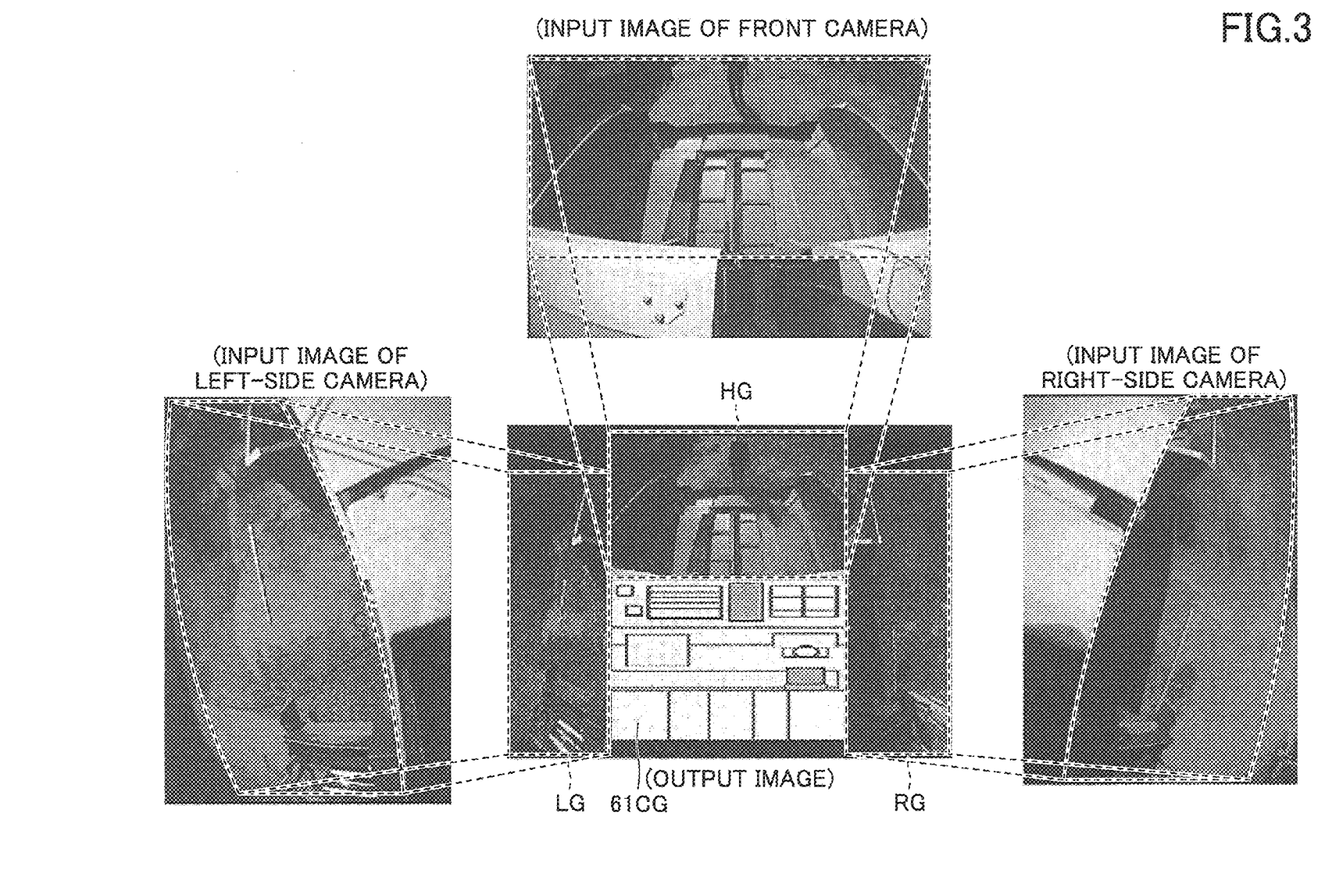
FIG. 3 is a drawing illustrating an example of a displayed output image.
Figure 4:
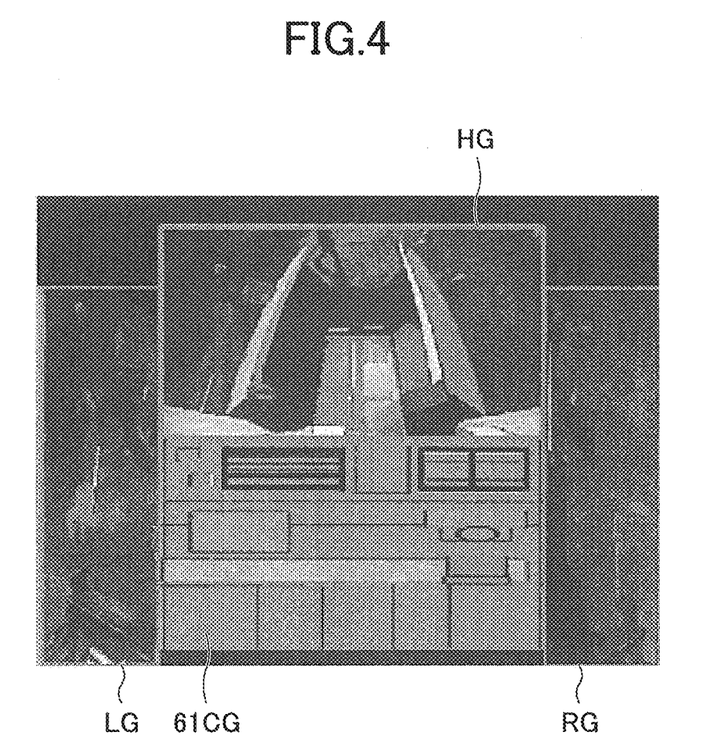
FIG. 4 is a drawing illustrating another example of a displayed output image.

FIGS. 3 and 4 illustrate examples of output images that are generated based on input images captured by the three cameras 2 (the left side camera 2L, the right-side camera 2R, and the front camera 2F) mounted on the asphalt finisher 60, and are displayed on the display unit 5. The output image of FIG. 3 indicates a state of the asphalt finisher 60 when the hopper 62 is fully opened, and the output image of FIG. 4 indicates a state of the asphalt finisher 60 when the hopper 62 is closed.

Each of the output images includes a hopper image HG, a left-side surrounding image LG, a right-side surrounding image RG, and an illustration image 61 CG. The image generation apparatus 100 places the hopper image HG, the left-side surrounding image LG, the right-side surrounding image RG, and the illustration image 61CG at predetermined sizes in predetermined positions in the output image such that an operator can recognize that the front side of the asphalt finisher 60 corresponds to the upper side of a screen of the display unit 5. This makes it possible to provide an operator with an image representing a downward view of the asphalt finisher 60 and areas around the asphalt finisher 60 and thereby makes it possible to enable the operator to easily recognize the positional relationship between the asphalt finisher 60 and surrounding objects.

The hopper image HG is generated based on an input image of the front camera 2F. In the present embodiment, the hopper image HG is a downward view of the hopper 62 seen from the tractor 61. The hopper image HG is generated by clipping a part of the input image of the front camera 2F, and is placed at the top center of the output image.

The left-side surrounding image LG is generated based on an input image of the left side camera 2L. In the present embodiment, the left-side surrounding image LG is a downward view of a surrounding area on the left side in the movement direction of the asphalt finisher 60. Specifically, the left-side surrounding image LG is generated by clipping a part of the input image of the left side camera 2L and performing distortion correction and image rotation on the clipped part of the input image. The left-side surrounding image LG is placed at the left end of the output image. The left-side surrounding image LG also includes an image of the left end of the screed and an image of the left end of the fully-opened hopper 62. The distortion correction indicates image processing for correcting apparent distortion, tilt, and shift of an image caused when, for example, a wide-angle lens is used. The image rotation indicates image processing for making the orientation of an image in the left-side surrounding image LG match the forward movement direction of the asphalt finisher 60 (or the upper side of the screen of the display unit 5). In the present embodiment, the effects of the distortion correction and the image rotation are incorporated into the correspondence between coordinates on an input image plane of the input image of the left side camera 2L and coordinates on the output image plane before the correspondence is stored in the input-output image correspondence map 40. The input-output image correspondence map 40 may also be configured to store the correspondence between coordinates on the output image plane and coordinates on an input image plane of an input image obtained by performing the distortion correction and the image rotation in real time. Also, the distortion correction and the image rotation may be performed on the hopper image HG.

The right-side surrounding image RG is generated based on an input image of the right side camera 2R. In the present embodiment, the right-side surrounding image RG is a downward view of a surrounding area on the right side in the movement direction of the asphalt finisher 60. Specifically, the right-side surrounding image RG is generated by clipping a part of the input image of the right side camera 2R and performing distortion correction and image rotation on the clipped part of the input image. The right-side surrounding image RG is placed at the right end of the output image. The right-side surrounding image RG also includes an image of the right end of the screed 63 and an image of the right end of the fully-opened hopper 62. In the present embodiment, the effects of the distortion correction and the image rotation are incorporated into the correspondence between coordinates on an input image plane of the input image of the right side camera 2R and coordinates on the output image plane before the correspondence is stored in the input-output image correspondence map 40. The input-output image correspondence map 40 may also be configured to store the correspondence between coordinates on the output image plane and coordinates on an input image plane of an input image obtained by performing the distortion correction and the image rotation in real time.

The illustration image 61CG is a computer graphic of the tractor 61, and is displayed as a replacement of an image of the tractor 61, which is not included in the imaging areas of the cameras 2, so that an operator can recognize the position of the tractor 61. The illustration image 61CG is placed at the bottom center of the output image.

Thus, a downward view of the asphalt finisher and surrounding areas is displayed as the output image.

In the above embodiment, the hopper image HG and the left-side surrounding image LG are a pair of discrete images that include image parts corresponding to the same area in a three-dimensional space. Similarly, the hopper image HG and the right-side surrounding image RG are a pair of discrete images that include image parts corresponding to the same area in the three-dimensional space. Thus, the image generation apparatus 100 displays an output image such that image parts corresponding to the same area in the three-dimensional space are displayed at two positions. This configuration makes it unnecessary to perform image processing to prevent image parts corresponding to the same area in the three-dimensional space from being displayed at two positions. Also, this configuration makes it possible to prevent an image part from being lost or the visibility of the image part from being reduced as a result of such image processing. Accordingly, the image generation apparatus can generate an output image that clearly shows an environment around the asphalt finisher 60 while preventing an increase in the computational load.

Also in the above embodiment, each of the hopper image HG, the left-side surrounding image LG, and the right-side surrounding image RG is generated based on an input image captured by the corresponding one of cameras. However, the present invention is not limited to this configuration. For example, each of the hopper image HG, the left-side surrounding image LG, and the right-side surrounding image RG may be generated based on input images captured by two or more cameras.

Figure 5:
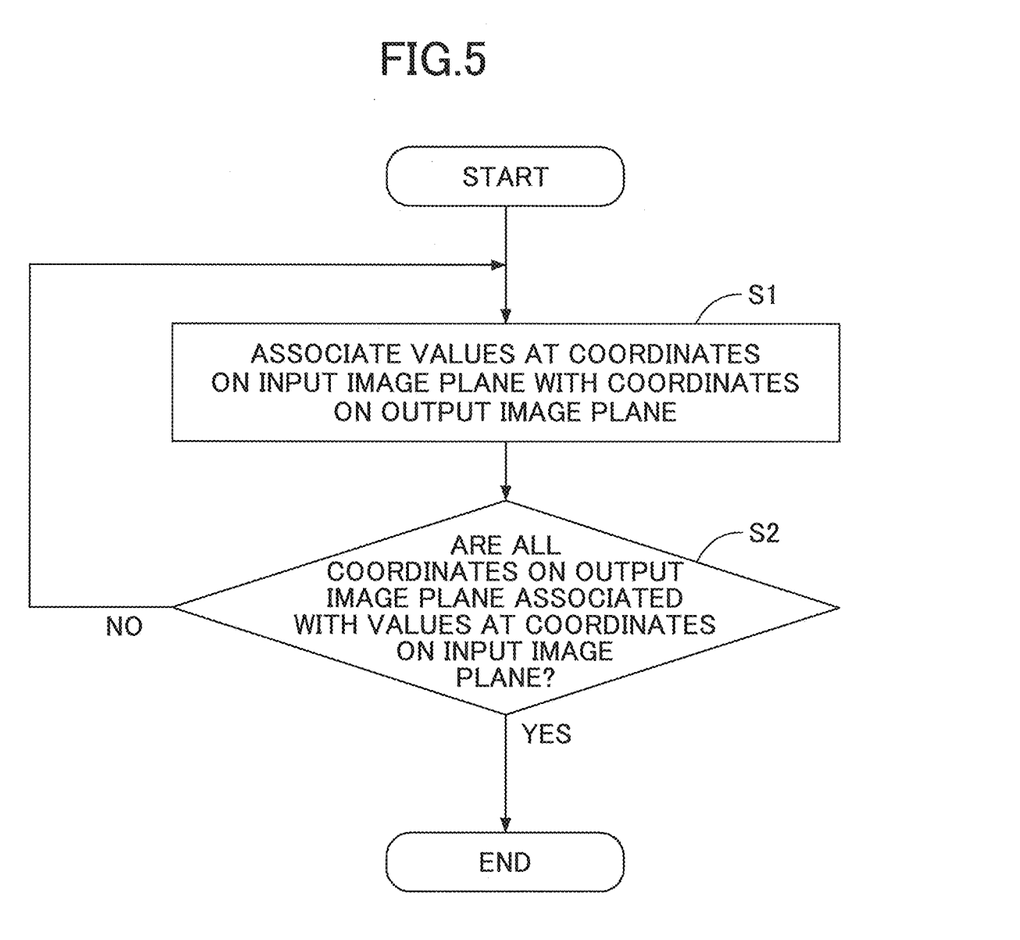
FIG. 5 is a flowchart illustrating an output image generation process.

Next, a process (which is hereafter referred to as an "output image generation process") performed by the image generation apparatus 100 to generate an output image is described with reference to FIG. 5. FIG. 5 is a flowchart illustrating the output image generation process. The image generation apparatus 100 performs the output image generation process each time input images are captured by the cameras 2.

First, the output image generation unit 10 of the controller 1 refers to the input-output image correspondence map 40 to obtain values (e.g., luminance, hue, and saturation values) at coordinates on input image planes corresponding to coordinates on an output image plane, and uses the obtained values as values at the corresponding coordinates on the output image plane (step S1).

Next, the controller 1 determines whether all of the coordinates on the output image plane have been associated with values at the corresponding coordinates on the input image planes (step S2). When not all of the coordinates on the output image plane have been associated with values (NO at step S2), the controller 1 repeats steps S1 and S2.

On the other hand, when all of the coordinates on the output image plane have been associated with values (YES at step S2), the controller 1 displays an output image on the display unit 5 and terminates the current output image generation process.

With the above configuration, the image generation apparatus 100 can generate, based on input images captured by multiple cameras, an output image that enables an operator to intuitively understand the positional relationship between the asphalt finisher 60 and surrounding obstacles including workers.

Also, the image generation apparatus 100 arranges the hopper image HG, the left-side surrounding image LG, the right-side surrounding image RG, and the illustration image 61CG in the output image to provide the operator with a downward view of the asphalt finisher and areas surrounding the asphalt finisher 60. This enables the operator to view blind areas around the asphalt finisher 60 without leaving the operator seat 64. Accordingly, the image generation apparatus 100 makes it possible to improve the safety and operability of the asphalt finisher 60. For example, the image generation apparatus 100 can provide the operator with information such as the amount of remaining asphalt mixture in the hopper 62 and positions of objects (e.g., manholes) on a road surface to be paved. Also, the image generation apparatus 100 can provide the operator with information indicating the positions of workers working around the asphalt finisher 60. With the image generation apparatus 100, the operator can perform various operations such as opening and closing of the hopper 62, expansion and contraction of the screed 63, and upward and downward movement of the screed 63 after confirming the positions of objects and workers displayed on the display unit 5. Also, the operator can cancel operations and stop the asphalt finisher 60 when a danger to workers is detected in relation to the hopper, the screed, or a dump truck.

An aspect of this disclosure provides an image generation apparatus and a paver operation assistance system that can display surrounding blind areas in an easily-understandable manner.

An image generation apparatus and a paver operation assistance system including the image generation apparatus according to embodiments of the present invention are described above. However, the present invention is not limited to the specifically disclosed embodiments, and variations and modifications may be made without departing from the scope of the present invention.

For example, the image generation apparatus 100 may be provided in a gussasphalt finisher that uses a gussasphalt mixture.

What is claimed is:

1. An image generation apparatus, comprising:
   a processor that generates an output image based on input images captured by multiple imaging units mounted on a paver including a hopper, a tractor, and a screed,
   wherein the output image includes a hopper image representing a downward view of the hopper, a left-side surrounding image representing a downward view of a surrounding area on a left side in a movement direction of the paver, a right-side surrounding image representing a downward view of a surrounding area on a right side in the movement direction of the paver, and an illustration image of the tractor; and
   wherein the processor arranges the hopper image, the left-side surrounding image, the right-side surrounding image, and the illustration image such that the hopper image is disposed on an upper side of the illustration image, the left-side surrounding image is disposed to a left of the illustration image, the right-side surrounding image is disposed to a right of the illustration image, and the output image represents a downward view of the paver.

2. The image generation apparatus as claimed in claim 1, wherein the processor
   places the hopper image at a top center of the output image;
   places the left-side surrounding image, which includes an image of a left end of the screed and an image of a left end of the hopper that is fully opened, in a left side of the output image; and
   places the right-side surrounding image, which includes an image of a right end of the screed and an image of a right end of the hopper that is fully opened, in a right side of the output image.

3. The image generation apparatus as claimed in claim 1, wherein the processor generates each of the hopper image, the left-side surrounding image, and the right-side surrounding image based on one of the input images that is captured by a corresponding one of the imaging units.

4. The image generation apparatus as claimed in claim 1, wherein the processor performs distortion correction on at least one of the hopper image, the left-side surrounding image, and the right-side surrounding image.

5. The image generation apparatus as claimed in claim 1, further comprising:
   a storage unit that stores an input-output image correspondence map indicating a correspondence between coordinates of the input images and coordinates of the output image,
   wherein the processor generates the output image by associating the coordinates of the input images with the coordinates of the output image according to the input-output image correspondence map.

6. The image generation apparatus as claimed in claim 1, further comprising:
   a front camera mounted on a front side of the tractor, a left-side camera mounted on a left side of the tractor, and a right-side camera mounted on a right side of the tractor that comprise the imaging units,
   wherein the processor generates the hopper image based on an input image captured by the front camera, generates the left-side surrounding image based on an input image captured by the left-side camera, and generates the right-side surrounding image based on an input image captured by the right-side camera.

7. The image generation apparatus as claimed in claim 6, wherein an imaging range of the front camera covers an entirety of the hopper.

8. The image generation apparatus as claimed in claim 6, wherein
   the processor generates the output image such that a non-rectangular area of the input image captured by the left-side camera corresponds to the left-side surrounding image with a rectangular shape and a non-rectangular area of the input image captured by the right-side camera corresponds to the right-side surrounding image with a rectangular shape.

9. The image generation apparatus as claimed in claim 1, wherein the processor
   places the hopper image at a top center of the output image;
   places the left-side surrounding image in a position that is in a left side of the output image and to a left of the hopper image, and
   places the right-side surrounding image in a position that is in a right side of the output image and to a right of the hopper image;
   wherein the hopper image and the left-side surrounding image are two images that respectively include first image parts corresponding to a same first area in a three-dimensional space such that the first image parts are displayed separately; and wherein the hopper image and the right-side surrounding image are two images that respectively include second image parts corresponding to a same second area in the three-dimensional space such that the second image parts are displayed separately.

10. A paver operation assistance system, comprising:
an image generation apparatus including
  a processor that generates an output image based on input images captured by multiple imaging units mounted on a paver including a hopper, a tractor, and a screed,
    the output image including a hopper image representing a downward view of the hopper, a left-side surrounding image representing a downward view of a surrounding area on a left side in a movement direction of the paver, a right-side surrounding image representing a downward view of a surrounding area on a right side in the movement direction of the paver, and an illustration image of the tractor; and
a display unit that is disposed near an operation unit for moving or operating the paver, and displays the output image generated by the processor of the image generation apparatus, wherein the processor arranges the hopper image, the left-side surrounding image, the right-side surrounding image, and the illustration image such that the hopper image is disposed on an upper side of the illustration image, the left-side surrounding image is disposed to a left of the illustration image, the right-side surrounding image is disposed to a right of the illustration image, and the output image represents a downward view of the paver.

* * * * *